July 6, 1965   C. B. ZIMMERMAN   3,192,816
TRAVERSE CONTROL MEANS FOR POWER TOOL
Filed June 4, 1963   2 Sheets-Sheet 1
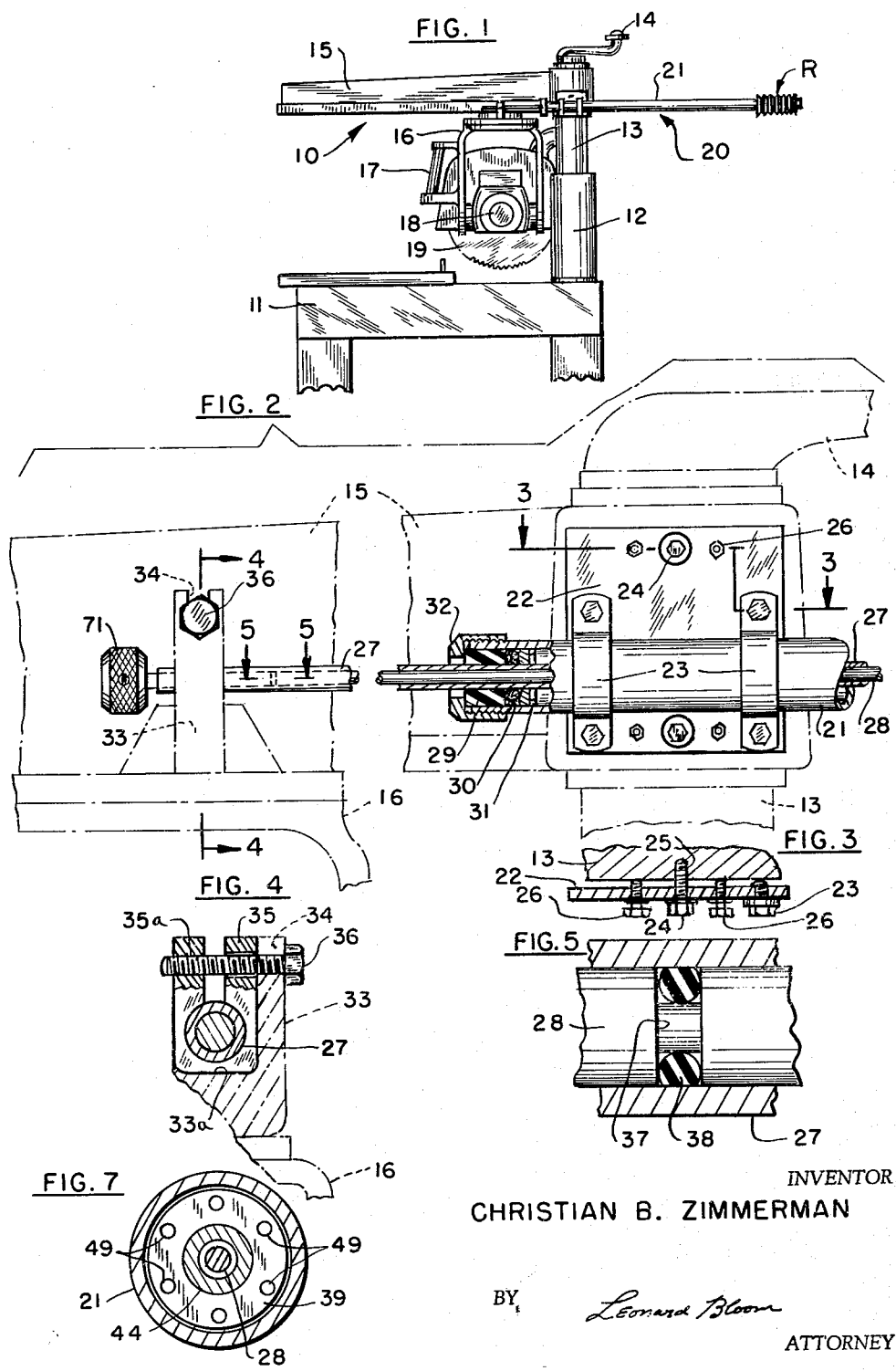
INVENTOR
CHRISTIAN B. ZIMMERMAN
BY  Leonard Bloom
   ATTORNEY July 6, 1965    C. B. ZIMMERMAN    3,192,816
TRAVERSE CONTROL MEANS FOR POWER TOOL
Filed June 4, 1963    2 Sheets-Sheet 2
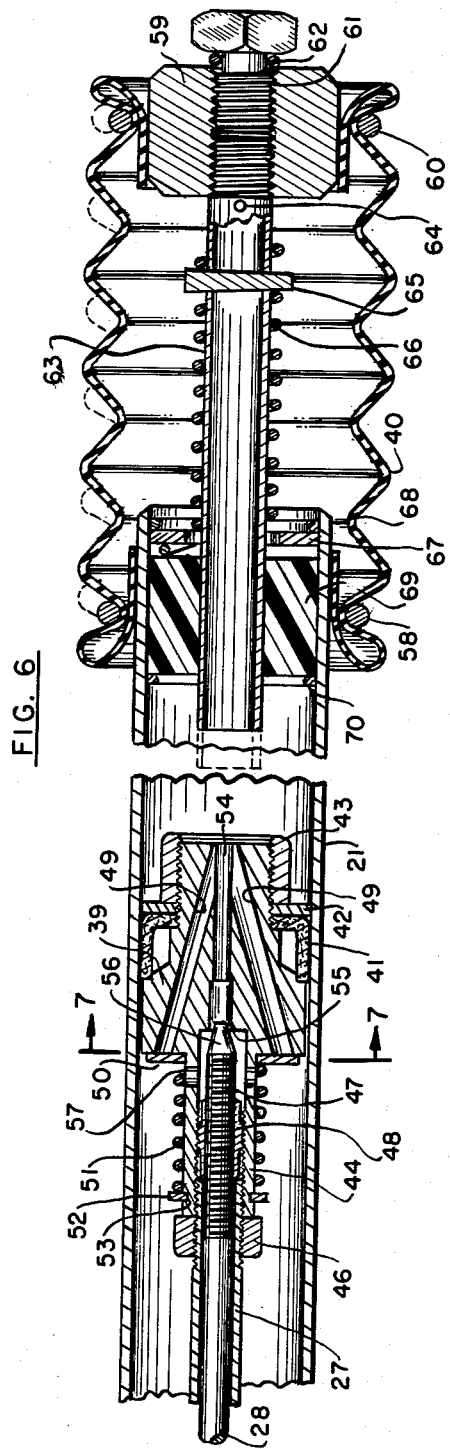
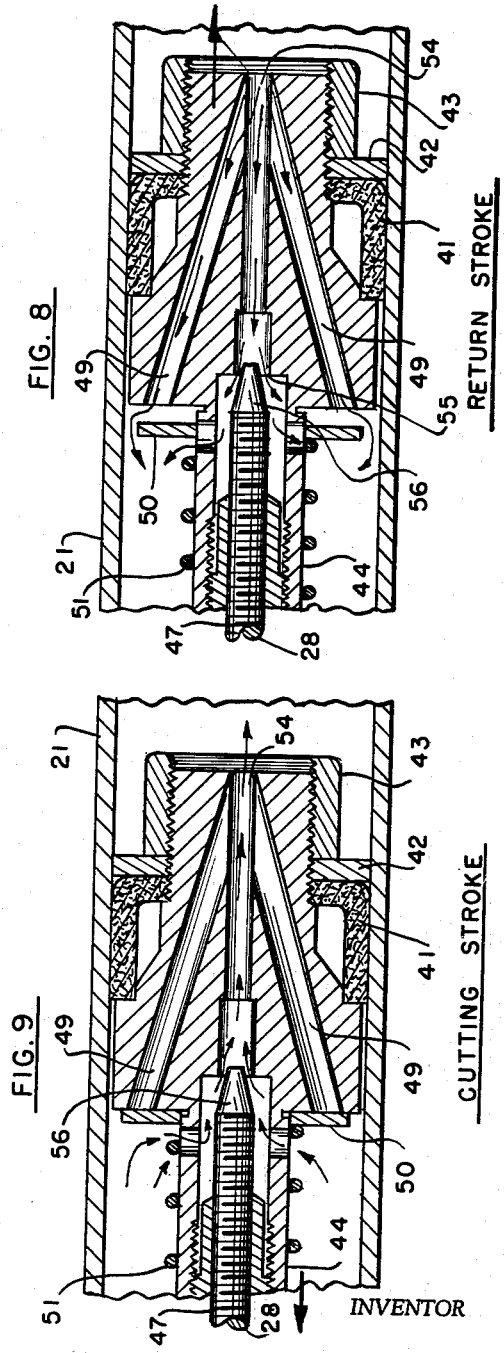
INVENTOR
CHRISTIAN B. ZIMMERMAN
BY
*Leonard Bloom*
ATTORNEY

United States Patent Office 3,192,816
Patented July 6, 1965

3,192,816
TRAVERSE CONTROL MEANS FOR POWER TOOL
Christian B. Zimmerman, Lancaster, Pa., assignor, by mesne assignments, to The Black and Decker Manufacturing Company, Towson, Md., a corporation of Maryland
Filed June 4, 1963, Ser. No. 285,296
9 Claims. (Cl. 83—489)

The present invention relates to a traverse control means for the manually-reciprocable tool carriage of a power-operated machine, such as a stationary radial-arm saw machine, and more particularly, to means for regulating the maximum rate of traverse of the tool carriage on its cutting stroke.

It is an object of the present invention to provide, for use in conjunction with a machine having a manually-reciprocable tool carriage, a traverse control means which has the following features and advantages: (1) controls the maximum manual traverse rate of the tool head or carriage; (2) may be adjusted for various maximum rates of traverse for the optimum cutting of different materials; (3) reacts to the forces generated by the "climb out" action of tools, such as a circular saw mounted upon the traversing carriage, to prevent the tool from gouging into the material being cut; (4) minimizes the tendency of the tool to "grab" the material being cut, thus facilitating increased cutting rates with the same power input to the machine; (5) equally distributes the loads on the cutting teeth of the tool, thereby improving the quality and finish of the cut; (6) eliminates the need for a high degree of human skill in making a cut with the traversing tool carriage, and thereby facilitates the use of the machine by a relatively inexperienced operator; (7) facilitates the efficient cutting of certain non-ferrous metals, such as relatively-thick aluminum extrusions, by means of, and fully consonant with, a manual pulling of the saw carriage as distinguished from an expensive power-operated feed device; (8) has a completely closed system, one which is free from dust particles or saw chips; (9) may be included as standard equipment with new production machines, or else may be sold separately as an accessory for quick installation on machines already in the field; and (10) in summary, is a low-cost simplified approach to the making of a faster cut, one which is more uniform and has a better finish, by even an inexperienced operator of the machine.

In accordance with the general teachings of the present invention, there is herein illustrated and described for use in conjunction with a power-operated machine of the type including a manually-reciprocable tool carriage having a cutting stroke and a non-cutting or return stroke, a traverse control means which comprises a cylinder mounted on the machine and a piston reciprocable within the cylinder. A piston rod is secured to one side of the piston and extends beyond one end of the cylinder. The piston rod is coupled to the tool carriage for reciprocation in unison, and the cylinder is completely filled with a fluid on both sides of the piston. Means is provided for admitting fluid to the piston rod side of the piston on the return stroke of the tool carriage; and means, including an orifice formed in the piston, is provided for restricting the flow of fluid back to the other side of the piston on the cutting stroke of the tool carriage, thereby regulating the maximum rate of traverse of the tool carriage on its cutting stroke.

In accordance with the more specific teachings of the present invention, there is herein illustrated and described a stationary radial-arm saw machine suitable for cutting wood, metals, plastics, and other types of material. The radial arm saw machine includes a manually-reciprocable tool or saw carriage, which has a cutting stroke and a non-cutting or return stroke. A cylinder is mounted on the frame of the radial arm saw and is aligned with the axis of reciprocation of the saw carriage. A piston is reciprocable within the cylinder, and a tubular piston rod is secured to the other side of the piston; the piston rod projects beyond one end of the cylinder and is coupled to the saw carriage for reciprocation in unison. The cylinder is completely filled with a fluid on both sides of the piston, and preferably, an extensible resilient bellows is secured on the other end of the cylinder remote from the piston rod. Fluid passage means is formed in the piston to communicate one side of the piston with the other side of the piston; and resiliently-biased valvular means, which normally closes the fluid passage means, opens to admit fluid to the piston rod side of the piston only on the return stroke of the saw carriage. Auxiliary fluid passage means, including a valve seat, is formed in the piston to further communicate one side of the piston with the other side of the piston. An axially-movable adjusting rod is disposed within the tubular piston rod and has a conical tip cooperating with the valve seat to form an orifice therebetween. The orifice provides a restriction through which fluid may flow through the piston and back towards the bellows on the cutting stroke of the saw carriage, thereby controlling the traverse of the manually-reciprocable saw carriage and regulating its maximum rate of traverse through the work. Moreover, the axial position of the adjusting rod may be varied with respect to the piston rod, so that a variable orifice or variable restriction is provided for the flow of fluid on the cutting stroke of the said carriage; and thus, the maximum rate of traverse of the saw carriage on its cutting stroke may be adjusted and optimized for the cutting of different materials.

These and other objects of the present invention will become apparent from a reading of the following specification, taken in conjunction with the enclosed drawings, in which:

FIGURE 1 is a side elevation of a radial arm saw machine having the traverse control means of the present invention included thereon;

FIGURE 2 is an enlarged fragmentary portion of FIGURE 1, showing the mounting of the traverse control means of the present invention to the radial arm saw machine;

FIGURE 3 is a section view taken along the lines 3—3 of FIGURE 2, showing the means for securing the cylinder to the machine, and further showing the means to align the cylinder with the axis of reciprocation of the tool carriage;

FIGURE 4 is a section view taken along the lines 4—4 of FIGURE 2, showing the means for securing the piston rod to the manually-reciprocable tool carriage;

FIGURE 5 is a section view taken along the lines 5—5 of FIGURE 2, showing the axially-slidable adjusting rod disposed within the tubular piston rod;

FIGURE 6 is an enlarged longitudinal section view of the major portion of the traverse control means of the present invention, the view being broken away for convenience of illustration, and showing the cylinder, the piston and piston rod reciprocating within the cylinder, the axially-slidable adjusting rod disposed within the piston rod, the variable orifice, and the resilient extensible bellows secured on the end of the cylinder;

FIGURE 7 is a section view taken along the lines 7—7 of FIGURE 6, showing the plurality of fluid passages formed in the piston to communicate one side of the piston with the other side of the piston;

FIGURE 8 is an enlarged fragmentary portion of FIGURE 6, showing the flow of fluid from one side of the piston to the other side of the piston on the non-cutting or return stroke of the tool carriage; and FIGURE 9 is an enlarged fragmentary portion of FIGURE 6 corresponding substantially to that of FIGURE 8, but showing the flow of fluid through the variable orifice on the cutting stroke of the tool carriage.

With reference to FIGURE 1, there is illustrated a conventional radial arm saw machine 10 suitable for cutting wood, metals, plastics, and other materials. It will be appreciated that the present invention is equally applicable to a wide variety of stationary power tools of the type which includes a manually-reciprocable work carriage, and that the present illustration of the radial arm saw machine 10 is only exemplary of the teachings of the present invention. With this in mind, the radial arm saw machine 10 comprises a table 11, a column base 12 secured to the table 11, a post or column 13 disposed within the base 12, a crank 14 for raising or lowering the column 13 with respect to the base 12, a radial arm 15 secured to the column 13 and projecting over the table 11, a manually-reciprocable tool or saw carriage 16 having an operating handle 17 by means of which the carriage 16 is manually traversed along tracks formed on the radial arm 15, the tool carriage 16 having a cutting stroke and a non-cutting or return stroke, an electric motor 18 mounted upon the tool carriage 16, and a rotary saw blade 19 (or other cutting tool) driven by the motor 18. The radial arm saw machine 10 is quite versatile and may be used for a variety of purposes, such as a cut-off saw, in which case the work is placed upon the table 11 and the tool of saw carriage 16 is manually pulled along the radial arm (and away from the column 13) in making the cut.

With reference again to FIGURE 1, and with further reference to FIGURES 3 and 4 the radial arm saw machine is provided with the traverse control means 20 of the present invention so as to control the maximum rate to which the tool carriage 16 may be manually pulled along the radial arm 15 on its cutting stroke. This traverse control means 20 includes a cylinder 21 which is secured to a plate 22 by means of a pair of brackets 23. The plate 22 is in turn secured to the vertical column 13 by means of a pair of screws 24, which are received within respective tapped holes 25 formed in the column 13. The plate 22 has four adjusting screws 26 by means of which the axis of the cylinder 21 may be accurately aligned with the axis of reciprocation of the tool carriage 16. Once the position of the adjusting screws 26 has been determined, the cylinder 21 may be removed from the column 13 by merely removing the two screws 24; and thereafter, the cylinder 21 may be secured to the column 13 by means of the screws 24 without the necessity for again adjusting the screws 26. A tubular piston rod 27 is guided within the cylinder 21, and an axially-movable adjusting rod 28, the purpose of which will hereinafter be described in detail, is guided within the tubular piston rod 27. The end of the cylinder (adjacent to the colmn 13) is provided with a bushing 29 of nylon or suitable material, a plurality of packing rings 30 of leather or other material, a split ring 31 to hold the packing rings 30 against the bushing 29, and an end cap 32 threaded on the end of the cylinder 21 for adjustment purposes. A member 33, see FIGURE 4, is secured to the traversing saw carriage 16 by suitable means, and the member 33 has a ledge 33a which supports a U-shaped clamp 35. The clamp 35 is secured to the member 33 by a screw 36 which passes through a slot 34 formed within the member 33. The tubular piston rod 27 is received within the U-shaped clamp 35 and is secured thereto by means of the screw 36, which is received within the threaded hole 35a. Consequently, the piston rod 27 is coupled to the saw carriage 16 for reciprocation in unison.

With reference to FIGURES 2, 4, and 5, the axially-movable adjusting rod 28, see FIGURE 5, has an external annular groove 37 within which a resilient O-ring 38 is disposed to engage against the inner wall of the tubular piston rod 27. The O-ring 38 serves as a seal between the adjusting rod 28 and the piston rod 27 and also creates a frictional "drag" to steady the movement of the adjusting rod 28.

With reference to FIGURES 6 and 7, a piston 39, which is secured to one end of the piston rod 27, is reciprocable within the cylinder 21. The cylinder 21 is completely filled with a fluid, such as oil, on both sides of the piston 39 and is purged of all air in a manner understood by one skilled in the art. The piston 39 may be considered as a member operating within a displacement chamber or a displacement reservoir, with the entire system being totally enclosed against dust particles or saw chips. An extensible resilient boot or bellows 40, which may be made of rubber or other material, is secured on the end of the cylinder 21. The forward end of the piston 39 (on the side of the bellows 40) carries a packing 41 secured by a retaining washer 42 and locking nut 43 threadably received on the piston 39. The opposite end of the piston 39 has an integral tubular neck 44, which has internal threads 45 to engage the externally-threaded portion of the piston rod 27; and a locking nut 46 secures the piston rod 27 to the piston 39. The axially-movable adjusting rod 28 has an externally-threaded portion 47 which engages within an internally-threaded locking sleeve 48. Consequently, the piston 39, piston rod 27, and adjusting rod 28 move axially as a unit, while the adjusting rod 28 is axially movable at the discretion of the operator. Fluid passage means is formed in the piston 39 to communicate one side of the piston with the other; this means comprises a series of inclined fluid passages 49 formed within the piston 39, circumferentially spaced with respect to each other as shown in FIGURE 7, and converging with each other as shown in FIGURE 6. A washer 50 is resiliently-biased against the end face of the piston 39 by means of a spring 51. The opposite end of the spring 51 seats against a split-ring 52 fitted within an external annular groove 53 formed within the integral neck 44 of the piston 39. The combination of the washer 50 and spring 51 comprises a "one way" valvular means which allows fluid to pass through the fluid passages 49 only on the non-cutting or return stroke of the tool carriage 16. An axial bore 54 is formed within the piston 39 and terminates in a valve seat 55. The end of the adjusting rod 28 has a conical tip 56 which is received closely within the valve seat 55 to form a variable orifice, and a pair of ports 57 are formed within the neck 44 to communicate one side of the piston 39 with the other through the variable orifice 55, 56. The combination of the bore 54, variable orifice 55, 56, and ports 57 comprises an auxiliary fluid passage means, which provides a variable restriction to the flow of fluid through the piston 39 and back into the other side of the piston on the cutting stroke of the tool carriage 16, thereby controlling the maximum rate of manual traverse of the carriage 16 on its cutting stroke.

With reference again to FIGURE 6, one end of the resilient extensible bellows 40 is secured on the end of the cylinder 21 by means of a clamping ring 58, while the outermost or cantilevered portion of the bellows 40 is secured to a plug retainer 59 by means of another clamp ring 60. The plug retainer 59 is internally threaded and carries a threaded cap or plug 61, and an O-ring 62 is disposed between the plug retainer 59 and the head of the plug 61. The other end of the plug retainer 59 carries a hollow guide rod 63 which extends partially within the end of the cylinder 21, and a port 64 is formed within the hollow guide rod 63. A pin 65 is secured to the rod 63 and serves as a seat for one end of a coil spring 66, the opposite end of which is seated within the end of the cylinder 21. The end of cylinder 21 is provided with a washer 67, a split-ring 68, a bushing 69 of nylon or suitable material, and a second split-ring 70. The end of the coil spring 66 is secured between the bushing 69 and the washer 67, and the bushing 69 forms a bearing for the axially-slidable guide rod 63. In operation, the guide rod 63 may slide axially within the bushing 69 of the cylinder 21, while the resilient bellows 40 may be compressed slightly as is indicated generally by the broken lines in FIGURE 6.

OPERATION

With reference to FIGURES 8 and 9, the operation and inherent utility of the present invention will be more clearly understood. FIGURE 8 corresponds to the noncutting or "return" stroke of the tool carriage 16, whereas FIGURE 9 corresponds to the "cutting" stroke of the tool carriage 16. In FIGURE 8, on the return stroke of the tool carriage 16, the piston 39 (together with the piston rod 27 and adjusting rod 28) moves towards the end of the cylinder 21 and to the right as indicated by the large arrow in FIGURE 8, such that the valvular washer 50 is lifted away from the end face of the piston 39 and against the spring 51. Fluid then flows through the fluid passages 49 and is admitted to the piston rod side of the piston 39, and a small portion of the fluid will also pass through the variable orifice 55, 56 and into the cylinder 21, the fluid flow being indicated by the small arrows. Then, as shown in FIGURE 9, on the cutting stroke of the tool carriage 16, the piston 39 moves away from the end of the cylinder 21 and to the left as indicated by the large arrow in FIGURE 9, such that the valvular washer 50 closes off the fluid passages 49 and precludes fluid from flowing back through the fluid passages 49. In this instance, the only path for the fluid to flow back into the end of the cylinder 21 is via the ports 57, the variable orifice 55, 56, and the axial bore 54 formed within the piston 39 as indicated by the small arrows.

Consequently, a traverse control means is provided which regulates or controls the maximum rate of manual reciprocation of the tool carriage 16, and this control means includes the variable orifice 55, 56, which may be adjusted for different degrees of fluid flow restriction corresponding to different maximum rates of manual traverse of the tool carriage 16 for the optimum cutting of different types of material. This insures a very clean cut without any jagged edges, discontinuities, or interruptions. Not only is the work performed superior to that which is obtainable previously, but also, operator fatigue is considerably reduced. Moreover, and inasmuch as the maximum rate of manual traverse of the carriage 16 on its cutting stroke is independent of the total force exerted by the operator in pulling back on the carriage 16, an inexperienced operator may be employed to operate the machine; and yet, his finished work will be comparable to that which even the most experienced operator could previously produce. The traverse control means 20 may be adjusted for cutting different materials; and the axially-movable adjusting rod 28, which determines the size of the orifice 55, 56 and hence the degree of restriction, may be adjusted conveniently by means of the knurled knob 71 shown in FIGURE 2. One such material, which could not be cut previously with the manually-operable radial-arm machine 10, is aluminum extrusions having an irregular cross-section and a depth or thickness of several inches.

Moreover, because of the traverse control means of the present invention, the radial arm saw machine has greater capacity for cutting heavy cross-sections of work material; yet, due to the uniform and lighter chip load, this increased machine capacity is realized together with a minimum deformation in light cross-sections of work material. Also, the power requirements of the machine are reduced because the peak demands of erratic cutting are eliminated. In view of the uniform wear on the cutting teeth of the blade, the life of the blade is enhanced; besides, the blade is more stable, and this contributes not only to a cooler cutting, but also, to a higher quality finish in the cut being made in the work. The chip removal lines, moveover, are uniform, which also improves the surface finish of the cut. The results that are obtained with the present invention are repetitive, and operator training is reduced to a minimum.

Obviously, many modifications may be made without departing from the basic spirit of the present invention; and accordingly, within the scope of the appended claims; the invention may be practiced other than has been specifically described herein.

I claim:

1. In combination with a stationary power tool including a manually-reciprocable tool carriage having a cutting stroke and a return stroke, traverse control means for the carriage, comprising:
   (a) a cylinder and means to mount the cylinder on the stationary power tool and to align its axis with the axis of recriprocation of the tool carriage;
   (b) a piston reciprocable in said cylinder;
   (c) a tubular piston rod secured to one side of said piston and projecting beyond one end of said cylinder;
   (d) means to couple said piston rod to the tool carriage for reciprocation in unison;
   (e) said cylinder being completely filled with a fluid on both sides of said piston;
   (f) fluid passage means formed in said piston and communicating one side of said piston with the other side of said piston;
   (g) resiliently-biased valvular means normally closing said fluid passage means, said valvular means being opened to admit fluid to the piston rod side of said piston only on the return stroke of the tool carriage;
   (h) auxiliary fluid passage means formed in said piston, communicating one side of said piston with the other side of said piston, and including a valve seat;
   (i) an axially-movable adjusting rod within said tubular piston rod and having a conical tip cooperating with said valve seat to form an orifice, thereby restricting the flow of fluid from the piston rod side of said piston and through said piston on the cutting stroke of the tool carriage, and thereby regulating the maximum rate of traverse of the tool carriage on its cutting stroke; and
   (j) manually-manipulatable means to adjust the axial position of said adjusting rod, whereby the orifice is variable, and whereby the traverse control means may be adjusted for the optimum cutting of different materials.

2. The combination according to claim 1, wherein said means to mount the cylinder to the stationary power tool and to align its axis with the axis of reciprocation of the tool carriage, comprises:
   (a) a plate secured to the stationary power tool;
   (b) bracket means to secure said cylinder to said plate; and
   (c) a plurality of adjusting screws passing through said plate and bearing against the frame of the stationary power tool.

3. The combination according to claim 1, wherein:
   (a) said piston has an internally-threaded integral tubular neck formed thereon; and
   (b) said piston rod is received within said neck and has external threads to engage said internal threads of said neck.

4. The combination according to claim 1, wherein:
   (a) said fluid passage means comprises a series of inclined fluid passages, circumferentially spaced with respect to each other and converging with each other on the side of said piston opposite from said piston rod; and wherein
   (b) said valvular means comprises a washer constantly urged against said piston and normally closing off said fluid passages.

5. The combination according to claim 1, wherein said auxiliary fluid passage means comprises:
(a) an axial bore formed in said piston and having said valve seat at one end thereof; and
(b) an integral tubular neck formed on the piston rod side of said piston and having a plurality of ports formed therein to communicate said axial bore with the piston rod side of said piston.

6. The combination according to claim 1, wherein:
(a) said adjusting rod has external threads adjacent to said conical tip; and wherein
(b) an internally-threaded locking sleeve is secured within said tubular piston rod and has internal threads to cooperate with said external threads of said adjusting rod;
(c) said adjusting rod having a manually-manipulatable external knob for axial adjustment of said adjusting rod.

7. The combination according to claim 1, wherein:
(a) an extensible resilient bellows is secured on the end of said cylinder opposite from said piston rod; and wherein
(b) an axially-movable tubular guide rod is carried by the end of said cylinder to guide said bellows;
(c) said tubular guide rod having at least one port formed therein to communicate said bellows with said cylinder.

8. In combination with a radial arm saw machine of the type having a table upon which the work is supported, a column at the rear of the table, a radial arm cantilevered mounted on the column and extending forwardly therefrom over the table, a saw carriage mounted for reciprocation on the radial arm, the saw carriage having a cutting stroke in which the carriage is drawn away from the column and towards the front end of the radial arm, and a return stroke in which the carriage is moved back towards the column at the rear of the machine, and a motor with a saw blade mounted on the carriage for cut-off purposes, the improvement which comprises a traverse control means for the carriage, said means comprising:
(a) a cylinder having one end thereof cantilever mounted near the top of the column and extending rearwardly therefrom along an axis which is substantially parallel to the radial arm;
(b) means including at least one adjusting screw to accurately aline the axis of said cylinder with the axis of reciprocation of the saw carriage;
(c) a piston reciprocable in said cylinder;
(d) a piston rod secured to one side of said piston and projecting forwardly therefrom beyond the cantilevered front end of said cylinder;
(e) means to couple said piston rod to the saw carriage for reciprocation in unison;
(f) said cylinder being completely filled with a fluid on both sides of said piston;
(g) valvular means within said cylinder for admitting fluid to the piston rod side of said piston from the other side of said piston on the return stroke of the saw carriage; and
(h) means including an orifice within said cylinder for restricting the flow of fluid back to the other side of said piston on the cutting stroke of the saw carriage, thereby regulating the rate of traverse of the saw carriage on its cutting stroke along the radial arm.

9. In combination with a radial arm saw machine of the type having a table upon which the work is supported, a column at the rear of the table, a radial arm cantilever mounted on the column and extending forwardly therefrom over the table, a saw carriage mounted for reciprocation on the radial arm, the saw carriage having a cutting stroke in which the carriage is drawn away from the column and towards the front end of the radial arm, and a return stroke in which the carriage is moved back towards the column at the rear of the machine, and a motor with a saw blade mounted on the carriage for cut-off purposes, the improvement which comprises a traverse control means for the carriage, said means comprising:
(a) a cylinder having one end thereof cantilever mounted near the top of the column and extending rearwardly therefrom along an axis which is substantially parallel to the radial arm;
(b) reservoir means including an extensible resilient bellows secured on the extreme rearward end of said cylinder and means to guide the bellows for limited movement in a direction axially of said cylinder;
(c) a piston reciprocable in said cylinder;
(d) a piston rod secured to one side of said piston and projecting forwardly therefrom beyond the cantilevered front end of said cylinder;
(e) means to couple said piston rod to the saw carriage for reciprocation in unison;
(f) said cylinder being completely filled with a fluid on both sides of said piston;
(g) valvular means within said cylinder for admitting fluid to the piston rod side of said piston on the return stroke of the saw carriage; and
(h) means including an orifice within said cylinder for restricting the flow of fluid back to the other side of said piston on the cutting stroke of the saw carriage, thereby regulating the rate of traverse of the saw carriage on its cutting stroke along the radial arm.

References Cited by the Examiner

UNITED STATES PATENTS

| | | | |
|---|---|---|---|
| 566,063 | 8/96 | Curley | 188—96 |
| 2,091,041 | 8/37 | Hallwood | 188—96 |
| 2,611,398 | 9/52 | Schutz | 143—6 |
| 2,745,320 | 5/56 | Groen | 188—96 |
| 2,825,427 | 3/58 | Steibel | 188—96 |
| 2,928,507 | 3/60 | Thompson | 188—100 |
| 1,006,219 | 4/57 | Germany. | |

FOREIGN PATENTS

ANDREW R. JUHASZ, *Primary Examiner.*

UNITED STATES PATENT OFFICE

CERTIFICATE OF CORRECTION

Patent No. 3,192,816　　　　　　　　　　　　　　July 6, 1965

Christian B. Zimmerman

It is hereby certified that error appears in the above numbered patent requiring correction and that the said Letters Patent should read as corrected below.

Column 1, line 23, for "out" read -- cut --; column 3, line 31, for "tool of" read -- tool or --.

Signed and sealed this 30th day of November 1965.

(SEAL)
Attest:

ERNEST W. SWIDER　　　　　　　　　　　　　EDWARD J. BRENNER
Attesting Officer　　　　　　　　　　　　　　Commissioner of Patents